United States Patent [19]

Marcerou et al.

[11] Patent Number: 5,295,217
[45] Date of Patent: Mar. 15, 1994

[54] AMPLIFIER HAVING AN AMPLIFYING OPTICAL FIBER

[75] Inventors: Jean-Francois Marcerou, Courcouronnes; Hervé Fevrier, Massy, both of France

[73] Assignee: Alcatel N. V., Amsterdam, Netherlands

[21] Appl. No.: 907,716

[22] Filed: Jul. 1, 1992

[30] Foreign Application Priority Data

Jul. 2, 1991 [FR] France ................. 91 08226

[51] Int. Cl.$^5$ .............................. G02B 6/00
[52] U.S. Cl. ..................... 385/122; 385/27; 372/6
[58] Field of Search ............ 385/122, 27, 24, 142; 359/341; 372/6

[56] References Cited

U.S. PATENT DOCUMENTS

| | | | |
|---|---|---|---|
| 5,039,199 | 8/1991 | Mollenauer et al. | 385/142 X |
| 5,042,039 | 8/1991 | Edagawa et al. | 385/122 X |
| 5,058,974 | 10/1991 | Mollenauer et al. | 385/27 |
| 5,140,456 | 8/1992 | Huber | 372/6 X |
| 5,177,634 | 1/1993 | Way | 372/6 |
| 5,185,826 | 2/1993 | Delavaux | 385/24 |
| 5,191,586 | 3/1993 | Huber | 372/6 |

OTHER PUBLICATIONS

IEEE Photonics Technology Letters vol. 2, No. 12, Dec. 1990, New York, pp. 866-868; Giles et al.; "Dynamic Gain Equalization in Two-Stage Fiber Amplifiers".

Electronics Letters, vol. 26, No. 10, 1 May 1990, Stevenage GB pp. 661-662; Masuda et al.: "High Gain Two-Stage Amplification with Erbium Doped Fibre Amplifier".

IEEE Photonics Technology Letters, vol. 2, No. 11, Nov. 1990, New York, pp. 787-789; Maeda et al.: 'An Electronically Tunable Fiber Laser with a Liquid-Crystal Etalon Filter as the wavelength Tuning Element'.

Primary Examiner—Rodney B. Bovernick
Assistant Examiner—Phan T. Heartney
Attorney, Agent, or Firm—Robbins, Berliner & Carson

[57] ABSTRACT

An amplifier having an amplifying optical fiber, the amplifier including means for reducing the optical noise due to amplified spontaneous emission, said means being inserted in the length of the amplifying optical fiber, wherein said means comprise an optical isolator.

3 Claims, 2 Drawing Sheets

AMPLIFIER HAVING AN AMPLIFYING OPTICAL FIBER

The present invention relates to an amplifier having an optical fiber that amplifies, e.g. because of erbium doping. Such an amplifier is particularly suitable for application in optical fiber undersea transmission systems.

BACKGROUND OF THE INVENTION

Erbium-doped optical fiber amplifiers are known, e.g. from Document FR 2 638 854, as are associated undersea transmission systems. Such amplifiers enable high gains to be obtained merely by passing the signal along an optical fiber, and this applies to the spectrum range 1.5 µm to 1.6 µm. However, it is known (see J. F. Marcerou et al., Proceedings SPIE 1373, pp. 168-186, 1991), that when it is desired to make full use of an erbium-doped optical fiber amplifier, it is limited by the optical noise it generates, known as "amplified spontaneous emission" (ASE). Amplified spontaneous emission is then responsible in part for saturating the laser medium, which happens to the detriment of amplifying the signal(s) present in the optical fiber. Indeed, that is why ASE is used for making excellent wideband superfluorescent sources.

Several solutions have already been proposed for solving this problem. To reduce the noise factor, it is possible to use short fibers, but that penalizes gain. It is also possible to use fibers that are not optimized, but that requires pumping powers that are too high.

Proposals have also been made to limit the effect of amplified spontaneous emission in amplifiers by inserting an optical filter in the length of erbium-doped fiber. The optical filter blocks a spectrum component of the noise in both directions. However, that method suffers from the drawback of limiting the passband of the amplifier and is risky when amplifiers are used in cascade due to the fact that the frequencies differ a little from one filter to another.

In order to mitigate these drawbacks, the present invention proposes using an isolator (one or more) and inserting it within the amplifying optical fiber. This serves to reduce the deleterious effects of optical noise.

SUMMARY OF THE INVENTION

The present invention thus provides an amplifier having an amplifying optical fiber, the amplifier including means for reducing the optical noise due to amplified spontaneous emission, said means being inserted in the length of the amplifying optical fiber, wherein said means comprise an optical isolator.

In an undersea transmission system, the amplifying fiber is advantageously of the erbium-doped optical fiber type.

BRIEF DESCRIPTION OF THE DRAWINGS

An embodiment of the invention is described by way of example with reference to the accompanying drawings, in which.

DETAILED DESCRIPTION

Surprisingly, the gain limitation introduced by the presence of amplified spontaneous emission is essentially due to noise propagating in the opposite direction to the optical pumping direction. According to the invention, this effect can be very considerably reduced by inserting an isolator within the doped fiber to limit saturation due to the optical noise propagating in the opposite direction to the signal.

Figure 1:
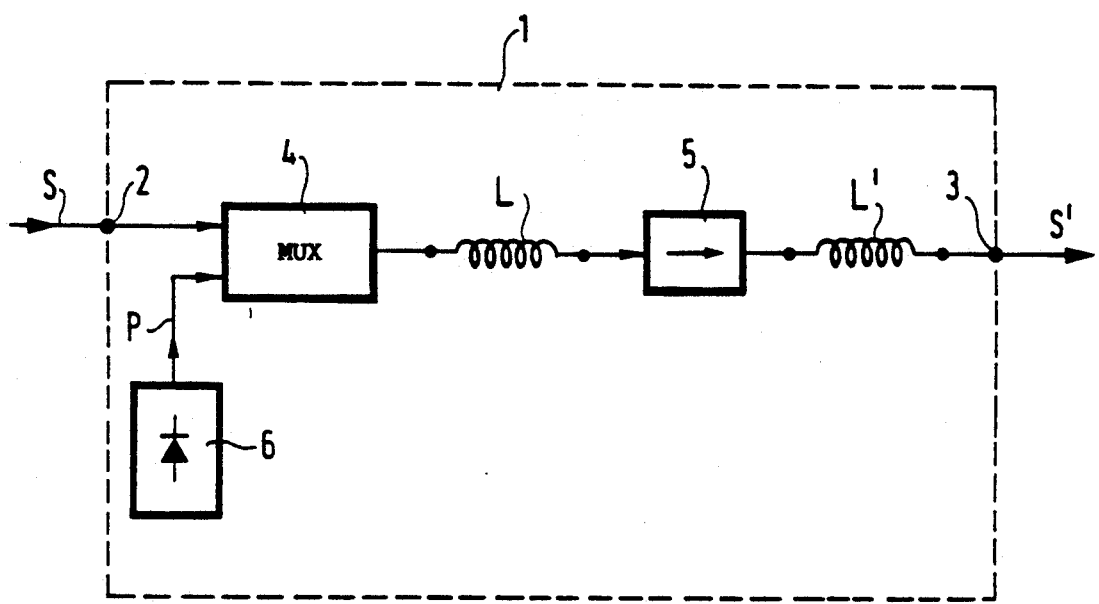
FIG. 1 shows an amplifier of the invention having an amplifying optical fiber.

With reference to FIG. 1, the amplifier 1 comprises in series between an inlet terminal 2 for the optical signal to be amplified and an outlet terminal 3 for the optical signal: a wavelength multiplexer 4; a first length L of doped optical fiber; an isolator 5; and a second length L' of doped optical fiber. The various components constituting the amplifier are connected together by welding. The multiplexer 4 provides coupling between the optical signal S to be amplified and of wavelength $\lambda s$, and the pumping signal P of wavelength $\lambda p$. The two signals S and P are applied to the inlet of the amplifying optical fiber.

In this embodiment, the amplifying optical fiber comprises a vitreous matrix having a core based on silica having oxides of the $Al_2O_3$ and $GeO_2$ type added thereto. It is doped with erbium to a concentration of 100 ppm. The index difference $\Delta n$ between the core of the fiber and its cladding is $32.10^{-3}$.

The amplifier also includes a device 6 for generating the pumping signal. This device comprises, for example, a laser diode delivering a pumping signal having a wavelength of 1.475 µm and a power of 35 mW.

Figure 2:
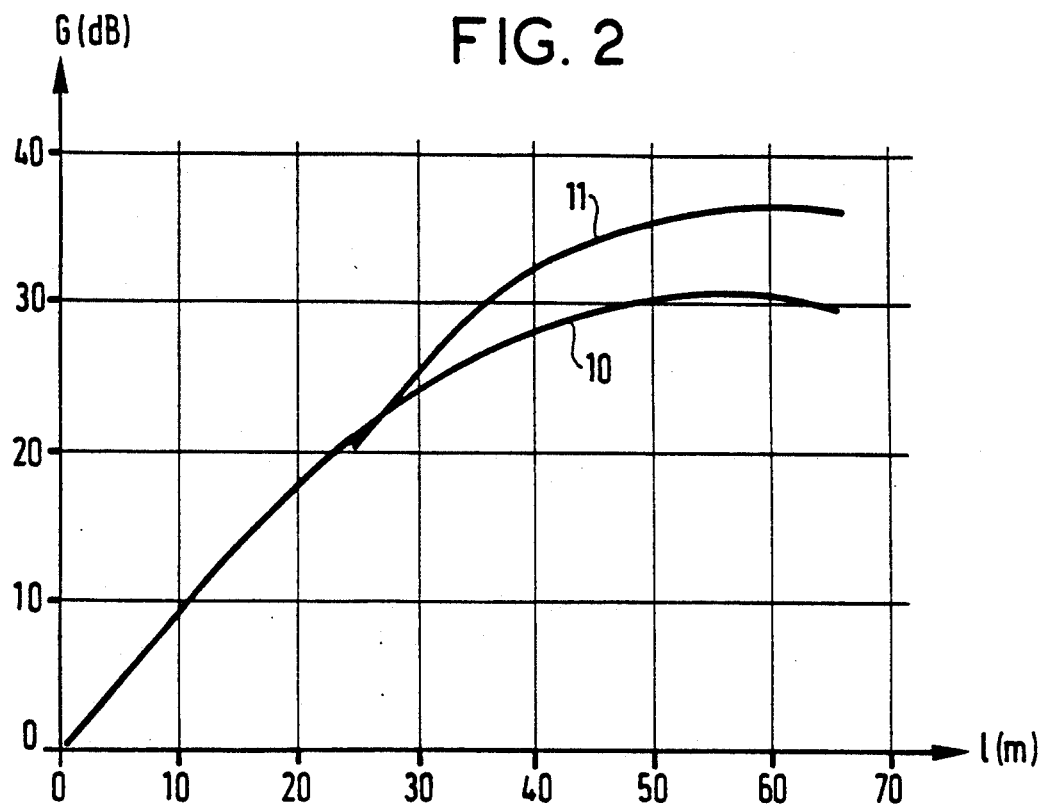
FIG. 2 is a comparative diagram giving the gain of the FIG. 1 amplifier as a function of the length of its amplifying optical fiber.
Figure 3:
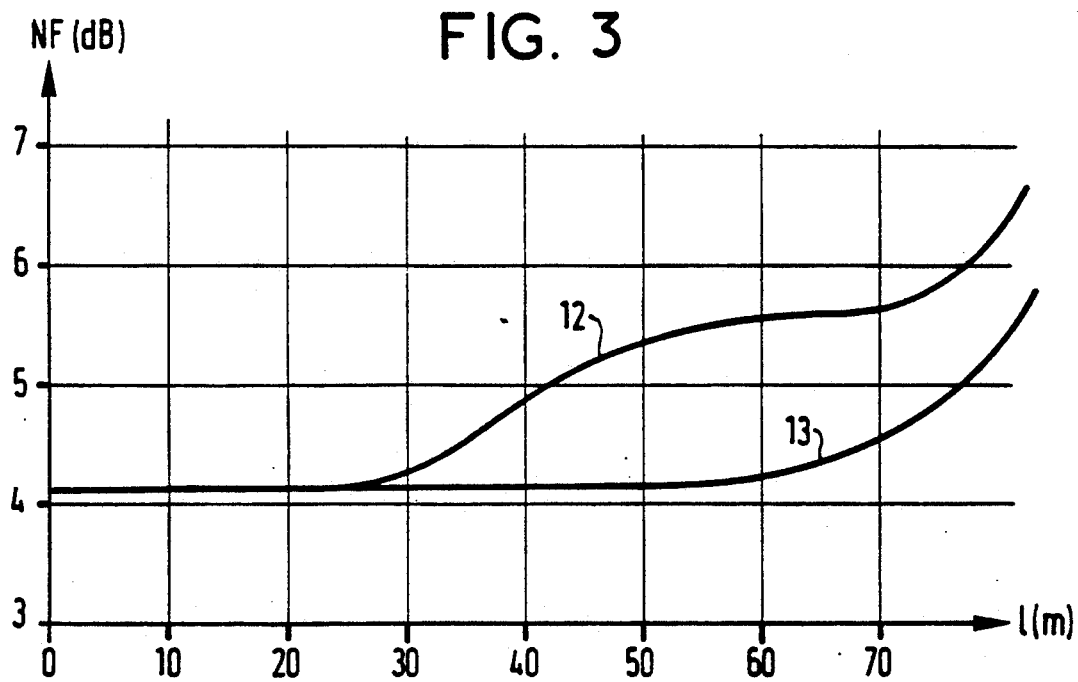
FIG. 3 is a comparative diagram giving the noise factor of the same amplifier as a function of the length of its amplifying optical fiber.

The diagrams of FIGS. 2 and 3 were obtained using an optical signal to be amplified having a wavelength of 1.55 µm and a power of $-30$ dBm. The diagram of FIG. 2 has the gain G of the amplifier expressed in decibels plotted up the ordinate as a function of the length 1 in meters of the amplifying fiber. Curve 10 was plotted for measurements performed using the amplifier of FIG. 1 without the isolator. Curve 11 was plotted using measurements performed using the same amplifier but fitted with the isolator 5.

The diagram of FIG. 3 plots the noise factor NF of the amplifier (in decibels) up the ordinate as a function of the length l. Curve 12 was plotted for measurements performed using the amplifier of FIG. 1 without the isolator. Curve 13 was plotted for measurements taken using the same amplifier but fitted with the isolator 5.

The optical isolator serves to transmit a signal from a source while greatly attenuating the return energy. A single isolator may be constructed on the basis of a beam-splitting and polarizing cube and a quarterwave plate. The incident light is polarized by the cube, and is then circularly polarized by the quarterwave plate. The return beam is circularly polarized in the opposite direction. On passing through the quarterwave plate it is linearly polarized and it is then blocked by the polarizing cube.

Optical isolators are components that are commercially available. In the present case, it must be transparent at two wavelengths (that of the signal to be amplified and that of the pumping signal) and the attenuation of the return beam must be greater than 25 dB. If necessary, it is possible to use a plurality of isolators.

It can clearly be seen from the diagrams of FIGS. 2 and 3, that without an isolator the amplifier cannot deliver a gain comparable to that obtained with an isolator, under operating conditions that are otherwise identical.

Under such conditions, the gain maximum appears around 60 meters (see the diagram of FIG. 2). That is why the isolator is placed at 25 m from the beginning of the doped fiber (L=25 m), which is about halfway along the optimum length of 60 m. In curve 11, there can be seen a small offset representative of the loss specific to the isolator (about 1.5 dB). This offset is nevertheless more than compensated, since for fiber lengths in the range 50 m to 60 m, the gain of the amplifier with an isolator is more than 6 dB greater than the gain of the amplifier without an isolator.

As can be seen in the diagram of FIG. 3, the noise factor can be improved by more than 1.5 dB for the amplifier with an isolator (curve 13) compared with the amplifier without an isolator (curve 12). This difference in terms of noise factor can be highly significant if the amplifier is being used as a receiver preamplifier or as a line amplifier in cascades comprising a plurality of amplifier modules in which the problem raised by accumulating amplified spontaneous emission along the cascade is critical.

It may be observed that the amplifier of the invention makes it possible to include an optical filter in the fiber isolator, and where appropriate the optical filter can serve to filter out a portion of the co-propagating noise.

What is claimed is:

1. An optical amplifier comprising an amplifying optical fiber having a first end and a
   second end and a length between said first and second ends substantially equal to an optimum length producing a maximum gain,
   means for coupling an optical signal and a pumping signal to said first end, and
   an optical isolator inserted in said amplifying optical fiber between said first and second ends, for transmitting said optical and pumping signals in a forward direction from said first end to said second end and for attenuating amplified spontaneous emissions travelling in a return direction opposite said forward direction,
wherein said optical isolator is inserted at about the halfway point of said optimum length to thereby maximize said maximum gain by minimizing the accumulated effects of said amplified spontaneous emissions.

2. An amplifier according to claim 1, wherein the amplifying optical fiber is an erbium-doped optical fiber.

3. An amplifier according to claim 1, further comprising additional optical isolators between said first and second ends.

* * * * *